(12) United States Patent
Camp et al.

(10) Patent No.: US 7,633,460 B2
(45) Date of Patent: Dec. 15, 2009

(54) ANTENNA FOR A BACKSCATTER-BASED RFID TRANSPONDER

(75) Inventors: Michael Camp, Celle (DE); Martin Fischer, Pfedelbach (DE)

(73) Assignee: Atmel Automotive GmbH, Heilbronn (DE)

( * ) Notice: Subject to any disclaimer, the term of this patent is extended or adjusted under 35 U.S.C. 154(b) by 78 days.

(21) Appl. No.: 11/953,845

(22) Filed: Dec. 10, 2007

(65) Prior Publication Data

US 2008/0143536 A1    Jun. 19, 2008

Related U.S. Application Data

(60) Provisional application No. 60/874,005, filed on Dec. 11, 2006.

(30) Foreign Application Priority Data

Dec. 9, 2006    (DE) .................... 10 2006 058 168

(51) Int. Cl.
*H01Q 1/36* (2006.01)
(52) U.S. Cl. ................ 343/895; 343/700 MS
(58) Field of Classification Search .......... 343/895, 343/700 MS, 795
See application file for complete search history.

(56) References Cited

U.S. PATENT DOCUMENTS

| 6,445,354 | B1 * | 9/2002 | Kunysz .................... 343/770 |
| 7,250,916 | B2 * | 7/2007 | Kunysz et al. .............. 343/770 |
| 2004/0056823 | A1 | 3/2004 | Zuk et al. |
| 2007/0057861 | A1 * | 3/2007 | Forster et al. ............... 343/806 |

FOREIGN PATENT DOCUMENTS

| DE | 10393263 T5 | 9/2005 |
| DE | 102006003717 A1 | 8/2007 |
| FR | 2 756 976 A1 | 6/1998 |
| WO | WO 2004027681 A2 | 4/2004 |

* cited by examiner

*Primary Examiner*—HoangAnh T Le
(74) *Attorney, Agent, or Firm*—Muncy, Geissler, Olds & Lowe, PLLC

(57) ABSTRACT

An antenna for a backscatter-based RFID transponder is provided with an integrated receiving circuit, having a capacitive input impedance, for receiving a radio signal lying spectrally in an operating frequency range, whereby the antenna has two antenna arms, which extend outward in a spiral from a central region in which the antenna arms can be connected to the integrated receiving circuit. According to the invention, a ring-shaped trace is provided, which extends completely around the central region and is formed to connect the antenna arms conductively to one another. The invention relates further to a backscatter-based RFID transponder with an antenna of this type.

24 Claims, 5 Drawing Sheets

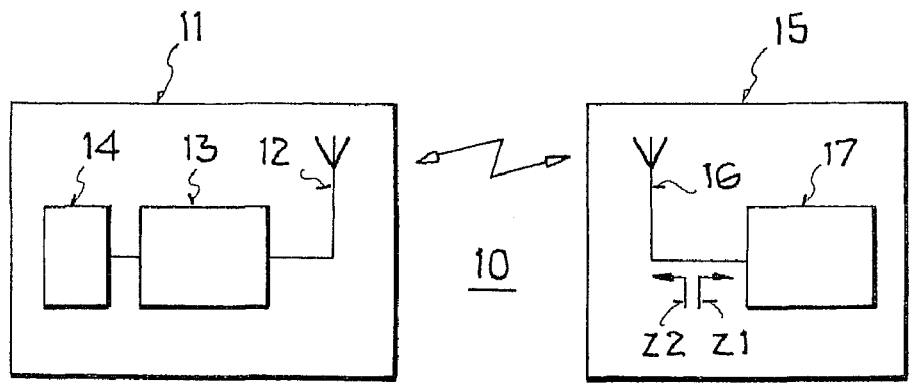
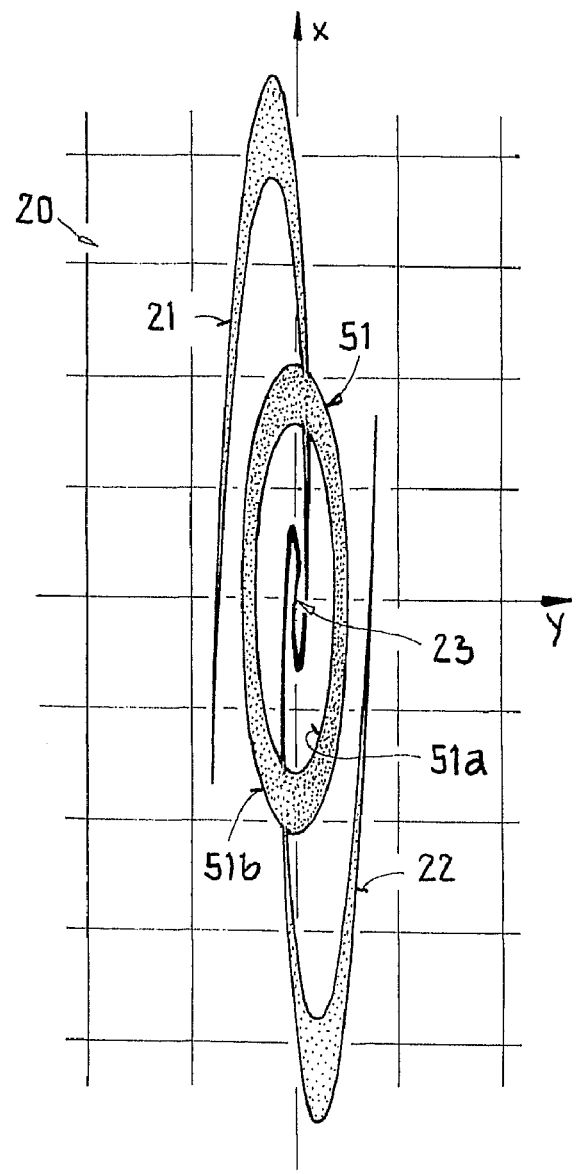
FIG. 1
FIG. 2a

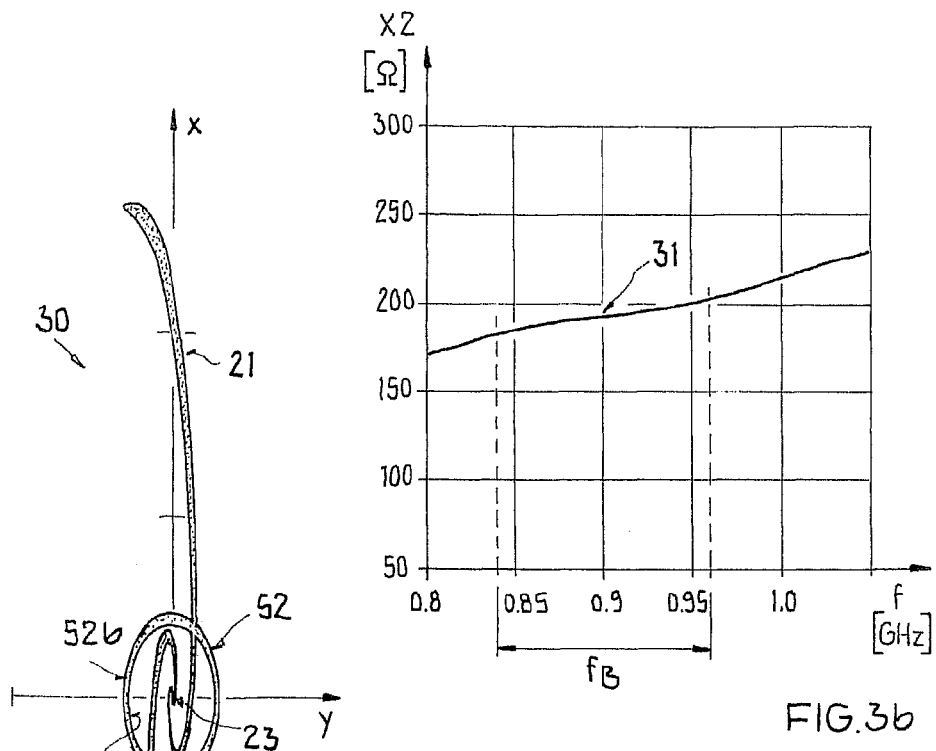
FIG.3a
FIG.3b
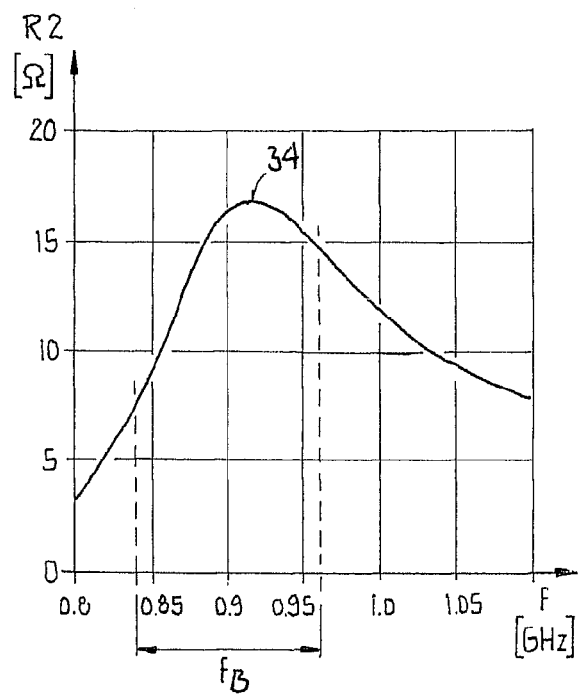
FIG.3c ns and the transponders and 20 remote sensors used for this purpose.

ANTENNA FOR A BACKSCATTER-BASED RFID TRANSPONDER

This nonprovisional application claims priority to German Patent Application No. DE 102006058168, which was filed in Germany on Dec. 9, 2006, and to U.S. Provisional Application No. 60/874,005, which was filed on Dec. 11, 2006, and which are both herein incorporated by reference.

BACKGROUND OF THE INVENTION

1. Field of the Invention

The present invention relates to an antenna for a backscatter-based RFID transponder (radio frequency identification) and to a backscatter-based RFID transponder.

2. Description of the Background Art

The invention falls within the field of wireless and contactless communication. It falls in particular within the field of radio-based communication for the purpose of identifying articles, animals, persons, etc., and the transponders and remote sensors used for this purpose.

Although it can be used in principle in any contactless communication systems, the present invention and the problem on which it is based are explained hereinbelow with reference to RFID communication systems and their applications. Here, RFID stands for radio frequency identification.

In RFID systems, data are transmitted bidirectionally with the use of high-frequency radio signals between a stationary or mobile base station, which is also often called a reading device, reader, or read/write device, and one or more transponders, which are attached to the articles, animals, or persons to be identified.

The transponder, which is also called a tag or label, typically has an antenna for receiving the radio signal emitted by the base station and an integrated circuit (IC) connected to the antenna. The integrated circuit in this regard comprises a receiving circuit for receiving and demodulating the radio signal and for detecting and processing the transmitted data. In addition, the integrated circuit has a memory for storing the data necessary for the identification of the respective article. Furthermore, the transponder may comprise a sensor, e.g., for temperature measurement, which, e.g., is also part of the integrated circuit. Such transponders are also called remote sensors.

RFID transponders may be used advantageously wherever automatic labeling, identification, interrogation, or monitoring is to occur. Articles such as, e.g., containers, pallets, vehicles, machines, luggage, but also animals or persons can be labeled individually with such transponders and identified without contact and without a line-of-sight connection. In the case of remote sensors, in addition, physical properties or sizes can be determined and queried.

In the field of logistics, containers, palettes, and the like can be identified to determine their actual whereabouts, for example, during their transport. In the case of remote sensors, e.g., the temperature of the transported products or goods can be routinely measured and stored and read at a later time. In the field of protection from piracy, articles, such as, e.g., integrated circuits, can be provided with a transponder in order to protect against unauthorized copies. In the commercial sector, RFID transponders in many cases can replace the bar code applied to products. There are additional applications, e.g., in the field of motor vehicles in antitheft devices or systems for monitoring air pressure in tires and in systems for access control for people.

Passive transponders do not have their own energy supply and obtain the energy necessary for their operation from the electromagnetic field emitted by the base station. Semi-passive transponders do have their own energy supply, but do not use the energy provided by it to transmit/receive data but, for example, to operate a sensor.

RFID systems with passive and/or semi-passive transponders, whose maximum distance from the base station is considerably greater than a meter, are operated in frequency ranges which are especially in the UHF or microwave range.

In such passive/semi-passive RFID systems with a relatively broad transmission range, a backscattering method (backscattering) is generally used for data transmission from a transponder to a base station, during which a portion of the energy arriving at the transponder from the base station is reflected (backscattered). In this case, the carrier signal emitted by the base station is modulated in the integrated circuit of the transponder according to the data to be transmitted to the base station and reflected by means of the transponder antenna. Such transponders are called backscatter-based transponders.

In order to achieve the greatest transmission range possible in backscatter-based transponders, it is necessary to supply as high a proportion as possible of the energy arriving from the base station at the transponder to the integrated receiving circuit of the transponder. Power losses of any type are to be minimized in this case. For this purpose, on the one hand, transponder antennas with a relatively broad receiving frequency range are required. Such relatively broadband antennas, in addition, can offer the advantage of fulfilling the requirements of several national or regional regulatory agencies with only one type of antenna. On the other hand, the energy picked up from the transponder antenna should be supplied as undiminished as possible to the integrated receiving circuit, which typically has a capacitive input impedance, i.e., an impedance with a negative imaginary part.

German Patent Application DE 103 93 263 T5 discloses an antenna for an RFID system, which has a planar spiral structure with two arms. Proceeding from a central region, the two arms each extend outward in a spiral. The input impedance of this antenna is also capacitive.

A disadvantage here is that the impedance of this antenna deviates greatly from the conjugate complex value for the impedance of the chip input circuit and, for this reason, an additional, separate matching circuit with a coil and a capacitor is required between the antenna and chip. Because of parasitic resistances in these elements, there are power losses on the transponder side, which reduce the transmission range in a deleterious way. Furthermore, the separate matching circuit limits the freedom in the placement of the chip and causes more complicated and therefore more cost-intensive implementations of the transponder.

SUMMARY OF THE INVENTION

It is therefore an object of the present invention to provide an antenna for a backscatter-based RFID transponder having an integrated receiving circuit (IC) for receiving a radio signal lying spectrally in an operating frequency range, said antenna that enables greater transmission ranges and simpler implementations of the transponder and permits broadband reception of high-frequency radio signals. It is furthermore the object of the invention to provide a backscatter-based RFID transponder that is simple to realize and has a greater transmission range in a broadband reception of high-frequency radio signals.

The antenna of the invention has two antenna arms, which extend outward in a spiral from a central region, in which the antenna arms can be connected to the integrated receiving circuit, whereby a ring-shaped trace is provided, which extends completely around the central region and is formed to connect the antenna arms conductively to one another.

The RFID transponder of the invention has an integrated receiving circuit with a capacitive input impedance and an antenna of the invention connected to the integrated receiving circuit.

In an embodiment, a ring-shaped trace is provided that extends completely around the central region and connects, i.e., contacts, the two antenna arms conductively to one another. As a result, degeneration of the resonance frequencies of the antenna occurs advantageously, which permits broader transmission ranges and a very broadband reception and moreover enables simpler and more cost-effective transponder realizations.

In an embodiment, each antenna arm has an arm length along the arm and the arm length is selected and the ring-shaped trace formed in such a way that the antenna has an input impedance with a reactance that is inductive in the operating frequency range and whose frequency response has an inflection point in the operating frequency range. In the embodiment of the ring-shaped trace, the form (circular, oval, etc.) and the path length along the trace are selected so that the frequency response of the reactance has an inflection point in the operating frequency range. Especially broadband antennas with an especially broad transmission range are made possible in this way, which require only a small area and are simple and cost-effective to implement.

In an embodiment, the ring-shaped trace has a path width, which is selected so that the antenna has values for an inductive input impedance that in the operating frequency range are approximated to the conjugate complex values for the capacitive input impedance in such a way that no circuit arrangement for impedance matching is necessary between the antenna and integrated receiving circuit. For integrated receiving circuits with typical impedance values and curves, the input impedance of the antenna in the operating frequency range is approximated to the conjugate complex values for the input impedance of the integrated receiving circuit in such a way that no separate matching circuit is necessary between the antenna and receiving circuit. Power losses on the transponder side are reduced in this way so that high transmission ranges result and broadband reception is possible. In addition, this makes possible especially simple and cost-effective implementations of the transponder.

The ring-shaped trace can have a border that is formed so that the antenna has values for an inductive input impedance that in the operating frequency range are approximated to the conjugate complex values for the capacitive input impedance in such a way that no circuit arrangement for impedance matching is necessary between the antenna and integrated receiving circuit. This makes possible especially simple and cost-effective transponder realizations, which nevertheless have a broad transmission range and an especially broad bandwidth, for many receiving circuits with different impedance values and curves.

In another embodiment, each antenna arm forms an inner radial spiral and an outer radial spiral, whereby these radial spirals preferably follow a logarithmic function. Antennas of this type advantageously have especially broad bandwidths.

The antenna arms can be formed planar and lie in a common plane. Preferably, each antenna arm comprises a thin conductive layer, which is formed on a substrate. As a result, the antenna can be implemented in an especially simple way.

In an embodiment, the integrated receiving circuit is disposed in the central region of the antenna arms. This enables very simple implementations of the transponder.

In another embodiment, each antenna arm can include a thin conductive layer, which is formed on a substrate, and the integrated receiving circuit is formed on the substrate. This enables especially simple implementations of the transponder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows an RFID system with a transponder of the invention;

FIG. 3 shows a second exemplary embodiment of an antenna of the invention; and

DETAILED DESCRIPTION

Figure 2B:
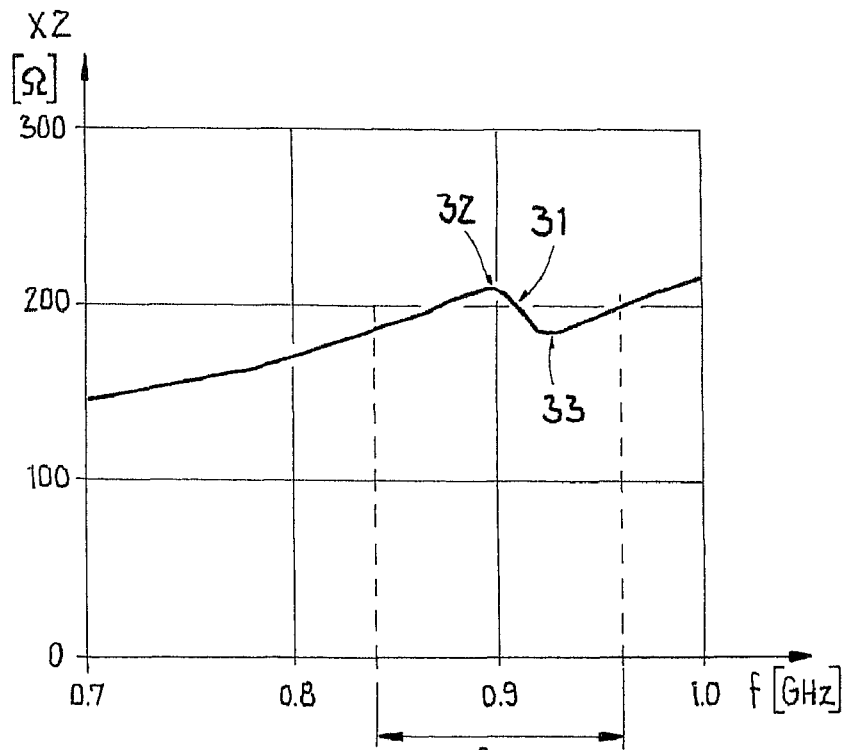
FIG. 2 shows a first exemplary embodiment of an antenna of the invention.

FIG. 1 shows schematically an example of an RFID system. RFID system 10 has a base station 11 and at least one transponder 15 of the invention. With the aid of high-frequency radio signals, base station 11 exchanges data with transponder(s) 15 in a contactless and bidirectional manner.

Base station 11 has at least one antenna 12 for transmitting and receiving radio signals in an operating frequency range fB, a transmitting/receiving unit 13, connected to the antenna(s), for transmitting and receiving data, and a control unit 14, connected to the transmitting/receiving unit, for controlling transmitting/receiving unit 13.

The backscatter-based, passive, or semi-passive transponder 15 has an antenna 16 for receiving the radio signal, lying spectrally in the operating frequency range fB, and a receiving circuit 17, connected to the antenna, for demodulating the received radio signal and for detecting the data contained therein. Receiving circuit 17 is hereby part of an integrated circuit (IC), not shown in FIG. 1, e.g., an ASIC (application specific integrated circuit) or an ASSP (application specific standard product), which in addition typically has a memory for storing the data necessary to identify the respective articles. Transponder 15 or the integrated circuit optionally comprises other components, not shown in FIG. 1, such as, e.g., a sensor for temperature determination. Such transponders are also called remote sensors.

It will be assumed hereinbelow that the operating frequency range fB is in the UHF frequency band, namely, in a frequency range between about 840 MHz and about 960 MHz. Alternatively, the operating frequency range can also extend into the ISM Band (industrial, scientific, medical), available virtually worldwide, between 2.4 and 2.5 GHz. Other alternative operating frequency ranges are 315 MHz, 433 MHz, and/or 5.8 GHz.

Because of the different current requirements of regulatory agencies in regard to maximum permissible transmitting powers in the frequency range between 840 and 960 MHz, transmission ranges of about 10 m in the read mode for the European market (2 W ERP) and about 11 m for the USA (4 W EIRP) are aimed for.

Integrated receiving circuit 17 has a complex-valued input impedance Z1 with a real part (effective resistance) R1 and an imaginary part (reactance) X1. The effective resistance R1 in this case is preferably relatively small to minimize power losses. The reactance X1 is usually capacitive (X1<0) and considerably greater in amount than the effective resistance, especially at low values for the effective resistance R1: |X1|>|R1|.

Integrated receiving circuits 17, developed by the applicant, have input impedances Z1 with effective resistances R1 in the range of about 4 . . . 35 ohm and capacitive reactances X1, whose absolute values are above about 170 ohm. The contribution of the imaginary part (|X1|) thereby greatly exceeds the real part (R1) (|X1|>4*R1). With the advancing manufacturing technology for integrated circuits and the thereby declining structural sizes, it can be assumed that capacitive reactances X1 will continue to increase in amount.

Antenna 16, shown symbolically in FIG. 1, of transponder 15 comprises two antenna arms, which extend outward in a spiral from a central region, in which the antenna arms are connected to integrated receiving circuit 17, and a ring-shaped trace, which extends completely around the central region and connects the antenna arms conductively to one another.

The antenna arms and the ring-shaped trace preferably each comprise a thin conductive layer, e.g., of copper, silver, etc., which is formed on a common substrate, e.g., of polyimide or on a printed circuit board. Preferably, integrated receiving circuit 17, which is disposed advantageously in the central region of antenna 16, is also formed on this substrate. Alternatively, it is possible to apply the thin conductive layer to a film on which integrated receiving circuit 17 is disposed by means of flip-chip technology. Transponder 15, having an antenna 16 and integrated receiving circuit 17, is finally attached to the article to be identified. Exemplary embodiments of antennas according to the invention are described in greater detail hereinbelow.

Figure 2C:
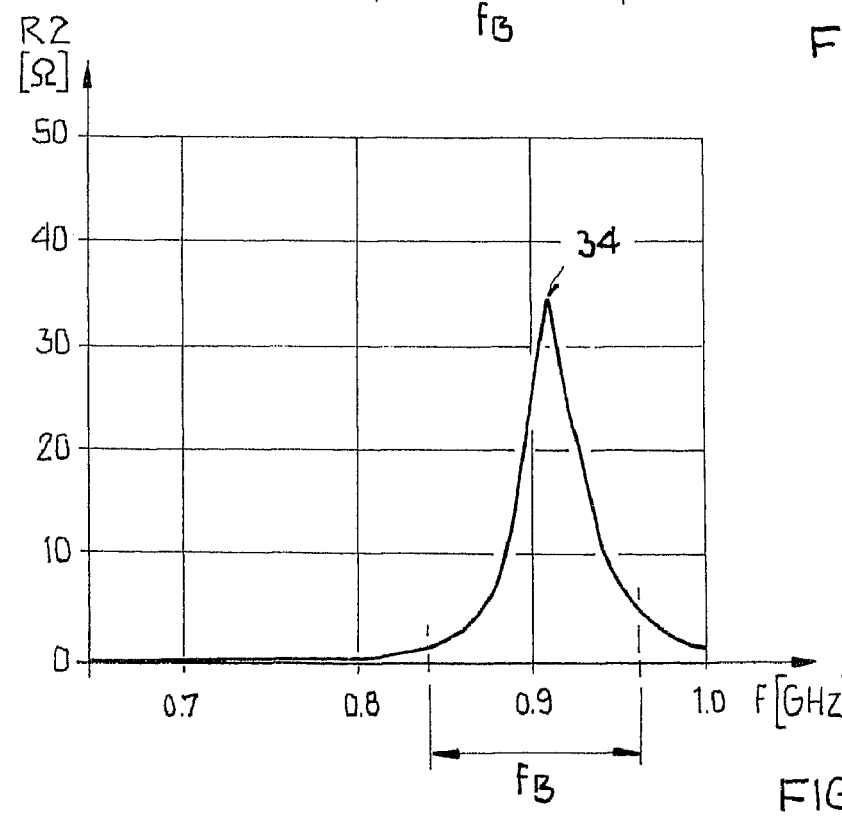

FIG. 2 shows a first exemplary embodiment of an antenna of the invention. Antenna 20 is shown in FIG. 2a in a plan view, whereas FIGS. 2b-c schematically show the frequency response of the input impedance Z2=R2+j*X2 of antenna 20 of FIG. 2a. The reactance X2, i.e., the imaginary part of Z2, is plotted versus the frequency f in FIG. 2b, whereas the effective resistance R2, i.e., the real part of Z2, is shown in FIG. 2c. The aforementioned operating frequency range fB between about 840 MHz and about 960 MHz is emphasized in FIGS. 2b-c.

According to FIG. 2a, antenna 20 has two antenna arms 21, 22, which are formed as traces and extend outward in a spiral from a central region 23, in which the antenna arms are connected (contacted) to integrated receiving circuit 17 (see FIG. 1). Further, antenna 20 has a ring-shaped trace 51, which extends completely around central region 23 and connects the two antenna arms 21, 22 conductively to one another.

The two antenna arms 21, 22 form a logarithmic spiral antenna compressed in the y direction or stretched in the x direction (and therefore elongated). In a logarithmic spiral antenna, each antenna arm 21, 22 forms an inner and outer radial spiral, which limit the arm and in each case obey a logarithmic function.

The two antenna arms 21, 22 are identical except for a 180-degree rotation and are formed point-symmetric to one another. In addition, the arms are formed planar and lie in a common plane.

The length along each arm is designated as the arm length Lz hereinafter. This refers to the distance from the connection point of an arm to integrated receiving circuit 17, which is also designated as a feed point, along the arm up to its outer endpoint. The arm width Wz, transverse to the arm trace, changes along each arm.

This antenna, shown schematically in FIG. 2a, has a spread of less than 100 mm in the x direction and of about 17 mm in the y direction, so that this antenna is particularly suitable for manufacturing on a band and/or for applications in which an elongated area is available for the antenna. The largest geometric dimension of this antenna for all wavelengths $\lambda$=c/f of the operating frequency range fB is less than the value $\lambda/\pi$, so that antenna 20, according to the definition of Wheeler (1975), is an "electrically small" antenna. Antenna 20 is thereby especially space-saving, so that especially simple and cost-effective transponder realizations 15 are made possible.

The ring-shaped trace 51 is closed (i.e., it forms a closed ring), point-symmetric to a central point in region 23, and—in this exemplary embodiment—made as an oval. It has an inner oval edge 51a and a concentric outer oval edge 51b. The ring-shaped trace 51 lies in the plane of antenna arms 21, 22 and forms a parallel inductor between the two antenna arms 21, 22.

The ring-shaped trace 51 is preferably formed and the arm length Lz selected in such a way that antenna 20 has an input impedance Z2 with a reactance X2>0, which is inductive over the entire operating frequency range fB and whose frequency response X2(f) has an inflection point in the operating frequency range fB. These circumstances are explained in greater detail hereinbelow.

It can be seen from the frequency response X2(f) of the reactance, as shown in FIG. 2b, that the reactance X2 even at the lower limit of the operating frequency range fB, i.e., at about 840 MHz, achieves a high inductance value of over 180 ohm. With increasing frequency values, the reactance X2 increases to a local maximum value 32 of about 210 ohm, then declines slightly to a local minimum value 33 of about 185 ohm, and then increases again to an upper limit of the operating frequency range fB; i.e., at about 960 MHz, a value of about 200 ohm is reached. An inflection point 31 of the frequency response X2(f), in terms of mathematical curve sketching, lies within the operating frequency range fB, namely, at about 910 MHz.

Antenna 20, shown in FIG. 2a, is formed so that its reactance X2, as shown in FIG. 2b, is inductive (X2>0) over the entire operating frequency range fB and has a frequency response X2(f) that has both an inflection point 31 and a local maximum value 32 and a local minimum value 33 in the operating frequency range fB; in each case, these do not occur at an edge of the operating frequency range fB. To this end, the length Lz of antenna arms 21, 22 and the form of ring-shaped trace 51 in particular are selected so that inflection point 31 and local extreme values 32, 33 are within the operating frequency range fB. The length Lz in FIG. 2a is selected so that antenna arms 21, 22 in each case can perform about two full turns around the central region. To form ring-shaped trace 51, particularly its shape (oval, circular, elliptical, etc.) and its path length Lr along trace 51 are selected as the best possible in the aforementioned sense. In the case of the oval form selected here for trace 51, this corresponds to the best possible selection of values for the radii Rx and Ry of trace 51 in the x or y direction, respectively. In FIG. 2a, the quotient of the radii Rx/Ry has the value 4.

The position of the connection points at which antenna arms 21, 22 are connected to trace 51 is also established by the selection of values for Lz and Lr. Furthermore, this also establishes the distances of these connection points from the feed points.

In other exemplary embodiments, the antenna is formed so that the frequency response $X2(f)$ has solely one inflection point but no local extreme values in the operating frequency range, or an inflection point and either a local maximum value or a local minimum value within fB.

The values for the inductive reactance X2 of antenna 20, as shown in FIG. 2b, in the operating frequency range fB correspond as a very good approximation to the absolute values |X1|, previously given in reference to FIG. 1, for the capacitive reactance X1 of a typical integrated receiving circuit 17. This relates in particular to receiving circuits that have a frequency response $X1(f)$, rising slightly across the frequency, of the capacitive reactance X1<0 in the operating frequency range fB.

It can be seen from the frequency response $R2(f)$ of the effective resistance, as shown in FIG. 2c, that the effective resistance R2 assumes a very low value of less than 2 ohm at the lower limit of the operating frequency range fB. With increasing frequency values, the value of the effective resistance R2 increases relatively greatly until a (local) maximum value 34 of about 34 ohm is achieved approximately in the middle of the operating frequency range fB at about 910 MHz. With further increasing frequency values, the effective resistance R2 then declines again relatively greatly and at the upper limit of the operating frequency range fB reaches a value of about 5 ohm.

Because of the ring-shaped trace 51 (FIG. 2a), degeneration of the antenna's resonance frequencies occurs. Thus, the frequency response $X2(f)$ of the reactance X2 at the frequency fRES (about 910 MHz), at which the effective resistance R2, according to FIG. 2c, assumes the local maximum value 34, has no zero crossing but an inflection point 31 according to FIG. 2b. This frequency fRES is therefore also called a "degenerate" resonance frequency.

The curve for $R2(f)$, shown in FIG. 2c, was achieved by varying in particular the path width Wr of ring-shaped trace 51 and selecting an optimal value Wr in regard to impedance matching. This is made possible in that, according to tests performed by the applicant, changes in the path width Wr influence the frequency response $R2(f)$ of the effective resistance much more greatly than the frequency response $X2(f)$ of the reactance. According to FIG. 2a, the path width Wr changes along trace 51. In the y direction, it is about 2 mm.

The values for the effective resistance R2 of antenna 20, as shown in FIG. 2c, in the operating frequency range fB correspond as a very good approximation to the values, previously given in reference to FIG. 1, for the effective resistance R1 of a typical integrated receiving circuit 17 with an effective resistance above about 15 ohm. Thereby the input impedance Z2=R2+j*X2 of antenna 20 in the operating frequency range fB approximates sufficiently accurately the conjugate complex values Z1'=R1−j*X1 of the input impedance Z1=R1+j*X1 of this type of receiving circuit. A separate circuit arrangement for impedance matching is advantageously not necessary.

Power losses on the transponder side are reduced in this way so that high transmission ranges result and broadband reception is possible over the entire operating frequency range fB. Tests performed by the applicant have produced transmission ranges in the read mode of about 10 m for the USA (4 W EIRP) and about 9 m for the European market (2 W ERP). In addition, integrated receiving circuit 17 can be advantageously placed as a result without restrictions by separate components for impedance matching directly in a connection area of antenna 16, so that especially simple and cost-effective but nevertheless high-performance transponder realizations are made possible.

The bandwidth of the entire system (transponder) depends greatly on the impedance of the integrated receiving circuit, on the antenna substrate carrier, and on the background to which the transponder is attached. Tests by the applicant have shown that bandwidths of about 70 MHz are achieved with antenna 20, shown in FIG. 2a, under the boundary conditions explained with reference to FIG. 1.

How close the inductive input impedance Z2 of the antenna can be brought to the likewise inductive impedance Z1' in this way depends on many, but particularly the following boundary conditions: a) the frequency-wise position and width of the desired operating frequency range fB, b) the value for the capacitive input impedance Z1 of receiving circuit 17 and its curve in the operating frequency range, and c) the precise form of the antenna.

FIG. 3 shows a second exemplary embodiment of an antenna of the invention. Antenna 30 is shown in a plan view in FIG. 3a, whereas FIGS. 3b-c show schematically the frequency response of the input impedance Z2=R2+j*X2 of the antenna of FIG. 3a.

According to FIG. 3a, antenna 30 also comprises two antenna arms 21, 22, which are formed as traces and extend outward in a spiral from central region 23, and a ring-shaped trace 52, which extends completely around central region 23 and connects the two antenna arms 21, 22 conductively to one another.

The point-symmetric antenna arms 21, 22, identical except for a 180-degree rotation, again form a logarithmic spiral antenna compressed in the y direction or stretched in the x direction (and therefore elongated). The arms are again formed planar and lie in a common plane.

The ring-shaped trace 52 is again closed, point-symmetric, and formed as an oval in this exemplary embodiment as well. It has an inner oval border 52a and a concentric outer oval border 52b. It lies again in the plane of antenna arms 21, 22.

In the y direction, antenna 30, shown in FIG. 3a, has the same spread (about 17 mm) as antenna 20 shown in FIG. 2a, whereas in the x direction it has a greater spread of about 140 mm overall and therefore is formed more elongated in comparison with the first exemplary embodiment. This makes Antenna 30 very space-saving and allows for very simple and cost-effective transponder realizations. It is also suitable for manufacturing on a band and/or for applications in which an especially elongated area is available for the antenna.

As can be seen from frequency response $X2(f)$ shown in FIG. 3b, the reactance X2 has a high inductance value of about 185 ohm even at the lower limit of the operating frequency range fB. With increasing frequency values, the reactance X2 rises gently but constantly until a value of about 205 ohm is achieved at the upper limit of the operating frequency range fB.

This exemplary embodiment is also formed so that the reactance X2 of antenna 30, as shown in FIG. 3b, is inductive (X2>0) over the entire operating frequency range fB and has a frequency response $X2(f)$ with an inflection point 31 in the operating frequency range fB, whereby the frequency response $X2(f)$ is advantageously relatively flat. Local extreme values do not occur here in the operating frequency range fB in contrast to the first exemplary embodiment.

To this end, the length Lz of antenna arms 21, 22 and the form of ring-shaped trace 52 in particular are selected so that inflection point 31 is within the operating frequency range fB. The length Lz in FIG. 3a is selected so that antenna arms 21, 22 in each case can perform about two full turns around the central region. To form ring-shaped trace 52, particularly its shape (oval, circular, elliptical, etc.) and its path length Lr along trace 52 are selected as the best possible in the aforementioned sense. In the case of the oval form for trace 52 selected here, this corresponds to the best possible selection of values for the radii Rx and Ry in the x or y direction, respectively. In FIG. 3a, the quotient of the radii Rx/Ry has the value 1.4. The values of Rx and Ry assure that ring-shaped trace 52 contacts each antenna arm only at precisely one place.

The values for the inductive reactance X2 of antenna 30, as shown in FIG. 3b, in the operating frequency range fB correspond as a very good approximation to the absolute values |X1|, previously given in reference to FIG. 1, for the capacitive reactance X1 of a typical integrated receiving circuit 17. This relates in particular to receiving circuits that in the operating frequency range fB have a frequency response $X1(f)$, with a flat course, possibly dropping slightly across the frequency, of the capacitive reactance X1<0.

It can be seen from frequency response $R2(f)$ of the effective resistance, as shown in FIG. 3c, that the effective resistance R2 assumes a value of about 7 ohm at the lower limit of the operating frequency range fB. With increasing frequency values, the value for the effective resistance R2 increases until a (local) maximum value 34 of about 17 ohm is achieved approximately in the middle of the operating frequency range fB at about 920 MHz. With further increasing frequency values, the effective resistance R2 then declines again and reaches a value of about 15 ohm at the upper limit of the operating frequency range fB.

In this exemplary embodiment as well, because of ring-shaped trace 52 (FIG. 3a), degenerations of the resonance frequency occur, as is evident from FIGS. 3b and 3c.

Particularly the path width Wr of ring-shaped trace 52 of the antenna, shown in FIG. 3a, was selected (under otherwise the same parameters) so that the curve for $R2(f)$ shown in FIG. 3c results. According to FIG. 3a, the path width Wr changes along trace 52. In the y direction, it is about 0.5 mm.

The values for the effective resistance R2 of antenna 30, as shown in FIG. 3c, in the operating frequency range fB correspond as a very good approximation to the values, previously given in reference to FIG. 1, for the effective resistance R1 of a typical integrated receiving circuit 17 with an effective resistance in the range of about 10-15 ohm. The input impedance Z2 of antenna 30 is thereby sufficiently matched to the conjugate complex values for the input impedance Z1 of this type of receiving circuit 17. A separate circuit arrangement for impedance matching is advantageously not necessary.

Because of the low steepness of the frequency responses $X2(f)$, $R2(f)$ in the operating frequency range fB, antenna 30 has an especially broad bandwidth. Tests by the applicant have produced bandwidths for the entire system of about 80 MHz. The transmission ranges are in the range of about 11 m for the USA and about 10 m for the European market. Further tests have shown that in the far field, antenna 30 has a radiation pattern largely corresponding to that of a dipole.

FIG. 4 shows other exemplary embodiments of the antenna of the invention, in which the ring-shaped trace is formed especially advantageously.

The ring-shaped traces 53-56, shown in FIGS. 4a-d, are each formed closed, point-symmetric, and oval (53-55) or circular (56). The shown ring-shaped traces 53-56 differ in their border. The border is selected here in terms of optimal impedance matching of the particular antenna to a typical integrated receiving circuit 17. The border is formed in particular so that the specific antenna has values for an inductive input impedance Z2 that in the operating frequency range fB are approximated to the conjugate complex values Z1' for the capacitive input impedance Z1 in such a way that no circuit arrangement for impedance matching is necessary between the antenna and integrated receiving circuit 17.

Figure 4A:
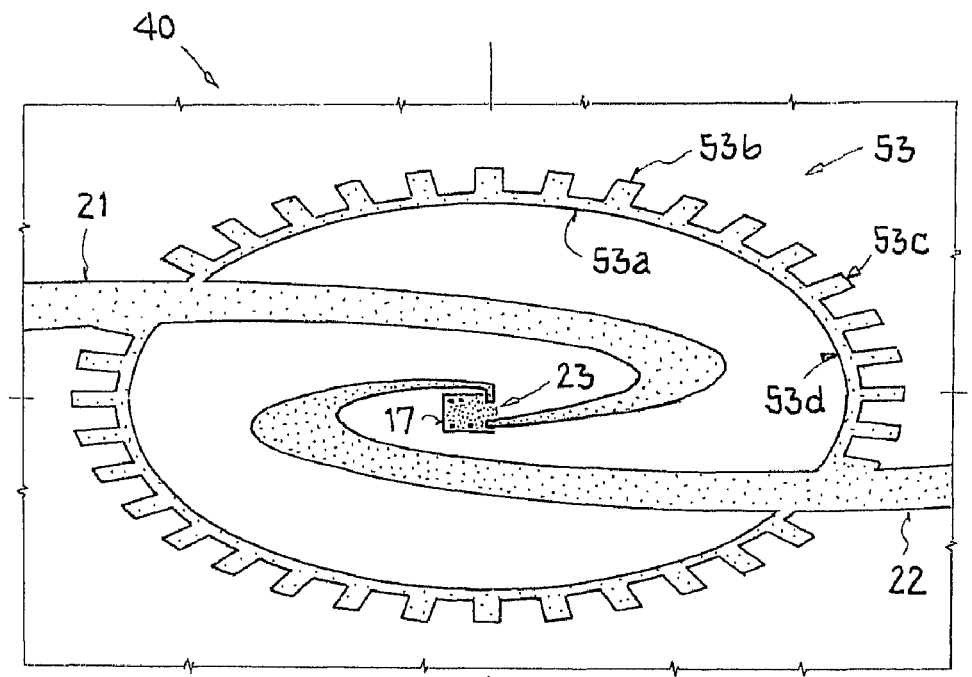
FIG. 4 shows other exemplary embodiments of antennas of the invention.
Figure 4B:
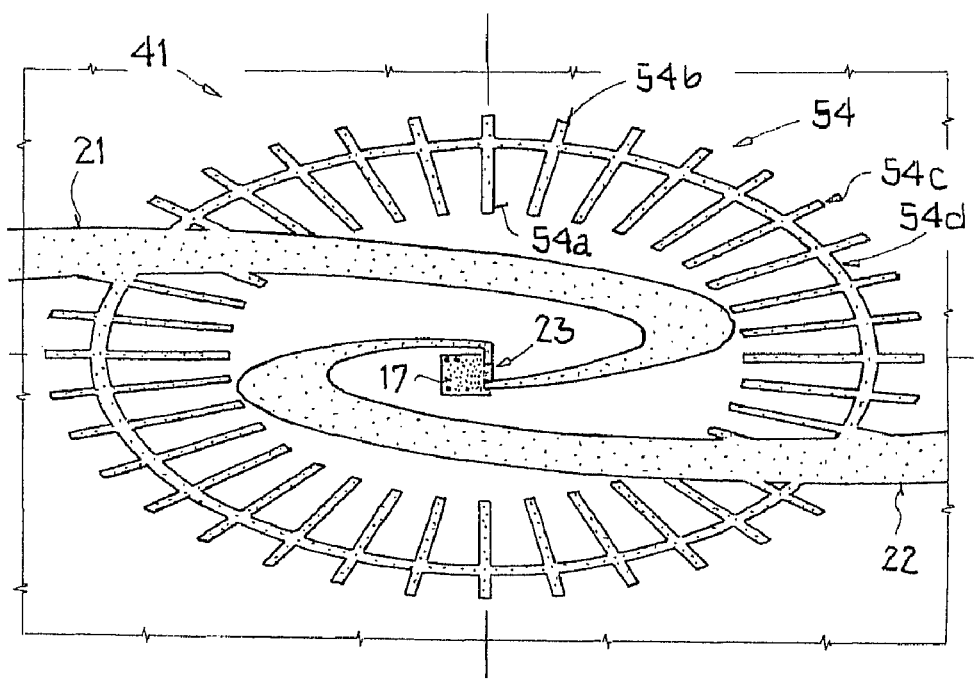
Figure 4C:
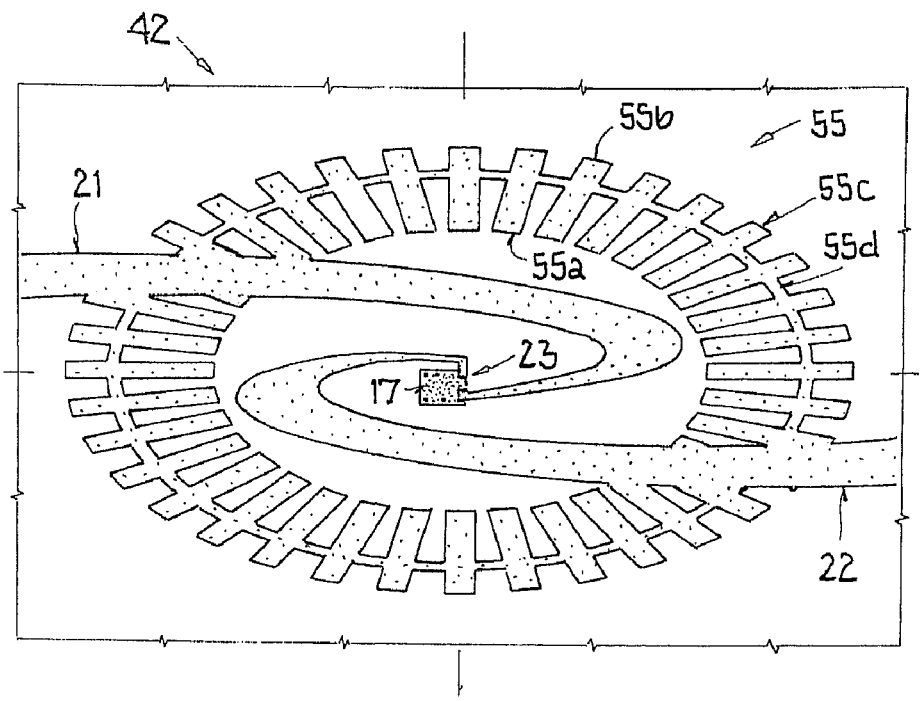

FIGS. 4a-c show enlarged sections of an inner area of three antennas of the invention. Antennas 40-42 are compressed or stretched logarithmic spiral antennas each with two, only partially shown antenna arms 21, 22, which extend in each case about two full turns around central region 23. In central region 23, antenna arms 21, 22 are connected at their feed points to a typical integrated receiving circuit 17. Antennas 40-42 require an elongated area of 140 mm×17 mm.

Furthermore, antennas 40-42 have a ring-shaped trace 53-55, which extends completely around central region 23 and connects antenna arms 21, 22 conductively to one another. Each of these traces 53-55 comprises a ring 53d-55d, whose form (oval), path length, radii, and path width are formed as previously described. The path width Wr of ring 53d-55d and thereby also that of trace 53-55 change along the ring or trace.

In addition, each of these traces 53-55 has a plurality of straight subsections 53c-55c, which are transverse to the trace, i.e., run in the radial direction, and are connected to trace 53-55. These straight subsections 53c-55c are formed herewith in terms of best possible impedance matching to a typical receiving circuit 17.

In the case of antenna 40 shown in FIG. 4a, subsections 53c are disposed outside the oval ring 53d, so that ring-shaped trace 53 has an inner, smooth edge 53a and a meander-shaped or crenelated, outer edge 53b. By variation of the width and/or length of subsections 53c, the impedance matching can advantageously be improved for typical receiving circuits with a low effective resistance. In the operating frequency range fB, antenna 40 has effective resistance values between about 8 and 18 ohm with a very flat curve for the frequency response $R2(f)$ and reactance values between 190 and 210 ohm.

In antennas 41-42, shown in FIGS. 4b-c, subsections 54c or 55c extend from a point outside the oval ring 54d or 55d to a point within the oval ring, so that both inner edge 54a or 55a or outer edge 54b or 55b have a meander-shaped or crenelated course.

In the case of antenna 41 shown in FIG. 4b, the length of the portion of subsections 54c, said portion lying within oval ring 54d, was selected in terms of best possible impedance matching. In the operating frequency range fB, antenna 41, in one respect, has higher effective resistance values with a maximum value above 35 ohm. The frequency response $X2(f)$ of the reactance, however, advantageously has a very flat course and, apart from an inflection point, also has a local maximum value and a local minimum value, so that here as well a separate circuit arrangement is advantageously not necessary for impedance matching in typical receiving circuits with an appropriate impedance course.

In antenna 42 shown in FIG. 4c, in addition the width of subsections 55c was selected in terms of best possible impedance matching. In the operating frequency range fB, antenna 42 advantageously has a very flat curve for the frequency response $X2(f)$ of the reactance with values between about 190 and 205 ohm. The effective resistance advantageously also exhibits a flat behavior with values between about 10 and 27 ohm, so that in typical receiving circuits a separate circuit arrangement for impedance matching is advantageously not necessary here as well.

Figure 4D:
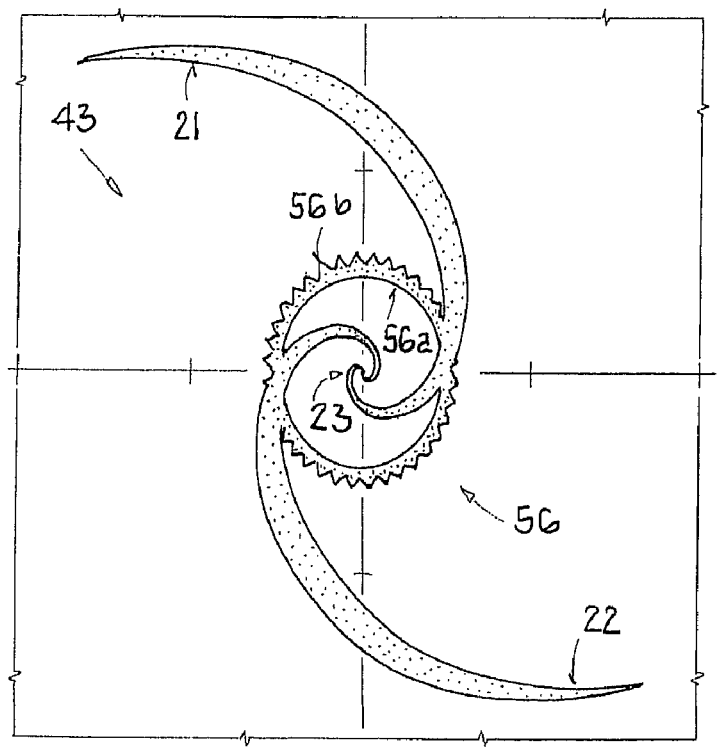

FIG. 4d shows a logarithmic spiral antenna 43 that is not compressed or stretched and has a square area of about 100 mm×100 mm. Antenna 43 has a circular, ring-shaped trace 56 with a circular smooth inner edge 56a and a serrated outer edge 56b. In this exemplary embodiment, the edge length of the v-shaped tooth is selected in terms of best possible impedance matching.

Tests by the applicant have shown that the antennas shown in FIG. 4 enable bandwidths above 80 MHz.

In other exemplary embodiments, which are not shown, only the inner edge is made serrated or both edges are formed serrated.

Although the present invention was described heretofore with reference to exemplary embodiments, it is not limited thereto but can be modified in many ways. Thus, the invention is limited, for example, neither to passive or semi-passive transponders nor to the indicated frequency bands, or the indicated impedance values for the integrated receiving circuit. Rather, the invention can be used advantageously in highly diverse contactless communication systems.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An antenna for a backscatter-based RFID transponder with an integrated receiving circuit, having a capacitive input impedance, for receiving a radio signal lying spectrally in an operating frequency range, the antenna comprising:
   two antenna arms, which extend outward in a spiral from a central region, in which the antenna arms are connected to the integrated receiving circuit; and
   a ring-shaped trace, which extends substantially completely around the central region and is formed to connect the antenna arms conductively to one another.

2. The antenna according to claim 1, wherein each antenna arm has an arm length along the arm, and wherein the arm length is selected and the ring-shaped trace formed in such a way that the antenna has an input impedance with a reactance, which is inductive in the operating frequency range and whose frequency response has an inflection point in the operating frequency range.

3. The antenna according to claim 2, wherein the arm length is selected and the ring-shaped trace formed in such a way that the frequency response of the reactance has a local maximum value and/or a local minimum value within the operating frequency range.

4. The antenna according to claim 2, wherein the ring-shaped trace has a form and a path length along the trace that are selected so that the frequency response of the reactance has an inflection point in the operating frequency range.

5. The antenna according to claim 4, wherein the form and path length are selected so that the frequency response of the reactance has a local maximum value and/or a local minimum value within the operating frequency range.

6. The antenna according to claim 1, wherein the ring-shaped trace is closed.

7. The antenna according to claim 1, wherein the ring-shaped trace is formed point-symmetric.

8. The antenna according to claim 1, wherein the ring-shaped trace is circular, oval, or elliptical.

9. The antenna according to claim 1, wherein the ring-shaped trace has a first radius, which is selected so that the frequency response of the reactance has an inflection point in the operating frequency range.

10. The antenna according to claim 9, wherein the ring-shaped trace has a second radius, which is selected so that the frequency response of the reactance has an inflection point in the operating frequency range.

11. The antenna according to claim 1, wherein the ring-shaped trace has a path width, which is selected so that the antenna has values for an inductive input impedance that in the operating frequency range are approximated to the conjugate complex values for the capacitive input impedance in such a way that no circuit arrangement for impedance matching is necessary between the antenna and integrated receiving circuit.

12. The antenna according to claim 1, wherein the ring-shaped trace has a border that is formed so that the antenna has values for an inductive input impedance that in the operating frequency range are approximated to the conjugate complex values for the capacitive input impedance in such a way that no circuit arrangement for impedance matching is necessary between the antenna and integrated receiving circuit.

13. The antenna according to claim 1, wherein the ring-shaped trace has a changeable path width along the trace.

14. The antenna according to claim 1, wherein the ring-shaped trace has a plurality of straight subsections, which are connected to the trace and run transverse to the trace.

15. The antenna according to claim 14, wherein the straight subsections are formed so that the antenna has values for an inductive input impedance that in the operating frequency range are approximated to the conjugate complex values for the capacitive input impedance in such a way that no circuit arrangement for impedance matching is necessary between the antenna and integrated receiving circuit.

16. The antenna according to claim 14, wherein the straight subsections have a length and width that are selected so that the antenna has values for an inductive input impedance, that in the operating frequency range are approximated to the conjugate complex values for the capacitive input impedance in such a way that no circuit arrangement for impedance matching is necessary between the antenna and integrated receiving circuit.

17. The antenna according to claim 1, wherein the ring-shaped trace has at least one serrated border.

18. The antenna according to claim 1, wherein each antenna arm forms an inner radial spiral and an outer radial spiral, which follow a logarithmic function.

19. The antenna according to claim 1, wherein the antenna arms are formed substantially identical in their outer form.

20. The antenna according to claim 1, wherein the antenna arms are formed planar and lie in a common plane.

21. The antenna according to claim 1, wherein the operating frequency range is in the UHF or microwave frequency range.

22. A backscatter-based RFID transponder, comprising:
   an integrated receiving circuit with a capacitive input impedance; and
   an antenna connected to the integrated receiving circuit, the antenna comprising:
      two antenna arms, which extend outward in a spiral from a central region, in which the antenna arms are connected to the integrated receiving circuit; and
      a ring-shaped trace, which extends substantially completely around the central region and is formed to connect the antenna arms conductively to one another.

23. The backscatter-based RFID transponder according to claim 22, wherein the integrated receiving circuit is disposed in the central region of the antenna arms.

24. The backscatter-based RFID transponder according to claim 22, wherein each antenna arm comprises a thin conductive layer, which is formed on a substrate, and the integrated receiving circuit is formed on the substrate.

* * * * *